United States Patent [19]

Rau et al.

[11] 4,453,993
[45] Jun. 12, 1984

[54] METHOD OF PRODUCING REINFORCED CAST TIRES

[75] Inventors: Hans J. Rau, Cologne; Gerhard Just, Leichlingen, both of Fed. Rep. of Germany

[73] Assignee: Bayer Aktiengesellschaft, Leverkusen, Fed. Rep. of Germany

[21] Appl. No.: 482,400

[22] Filed: Apr. 6, 1983

[30] Foreign Application Priority Data

Apr. 22, 1982 [DE] Fed. Rep. of Germany ....... 3214908

[51] Int. Cl.³ .................... B29H 17/28; B29H 17/12; B60C 9/16
[52] U.S. Cl. .................... 156/124; 156/125; 156/130.7; 156/132; 156/134; 264/258; 264/261; 264/311; 264/324; 264/326
[58] Field of Search .............. 156/123 R, 124, 125, 156/132, 133, 134, 126, 128.1, 130, 130.7, 70, 74, 91–93; 264/257, 258, 310, 311, 328.3, 326, 324, 261; 29/460; 152/354 R, 354 RB, 355, 357 R, 358, DIG. 14; 140/107, 112; 16/18 R, 45

[56] References Cited

U.S. PATENT DOCUMENTS

| | | | |
|---|---|---|---|
| 1,166,326 | 12/1915 | Coffey et al. | 264/326 X |
| 1,529,841 | 3/1925 | Marquette | 156/126 |
| 2,401,045 | 5/1946 | Brickman | 156/132 X |
| 2,501,644 | 3/1950 | Kraft et al. | 156/124 |
| 2,860,379 | 11/1958 | Beckadolph et al. | 156/125 X |
| 3,616,132 | 10/1971 | Klingbeil et al. | 156/126 X |
| 3,975,490 | 8/1976 | Lapeyre | 264/250 |
| 4,185,065 | 1/1980 | Knipp et al. | 264/254 |
| 4,279,856 | 7/1981 | Vente et al. | 264/313 |
| 4,313,482 | 2/1982 | Vente et al. | 152/330 R |
| 4,412,965 | 11/1983 | Thompson et al. | 156/125 X |

FOREIGN PATENT DOCUMENTS

| | | |
|---|---|---|
| 1505030 | 4/1969 | Fed. Rep. of Germany . |
| 1301045 | 8/1969 | Fed. Rep. of Germany . |
| 1605684 | 4/1971 | Fed. Rep. of Germany . |
| 1246471 | 9/1971 | United Kingdom . |

Primary Examiner—William A. Powell
Assistant Examiner—Thomas Bokan
Attorney, Agent, or Firm—Gene Harsh; Joseph C. Gil

[57] ABSTRACT

The instant invention is directed to a method for producing reinforcement for cast tires and a method for the production of reinforced cast tires having bead rings, from castable elastomers, the tire inside the mold being restricted by a core during the formation, characterized in that before the toroidal tire core is installed into the mold, the reinforcement and the bead rings are applied thereto. First, the two bead wires are enclosed by a piece of cut fabric which is adapted to the size of the tire, the warp threads in the fabric running substantially perpendicular to the bead rings, then two sides of the fabric are joined, such that the jointure seam runs substantially parallel to the weft direction, as a result of which, both bead wires are connected via the piece of fabric. When the fabric has been pushed together to at least half the circumference of the bead rings, the two rings are positioned on either side of the tire core and the piece of fabric is then drawn around the rings and over the complete core and joined together at its ends.

12 Claims, 6 Drawing Figures

METHOD OF PRODUCING REINFORCED CAST TIRES

This invention relates to a method for producing reinforcement for cast tires and to a method of producing reinforced tires which have bead rings, from castable elastomers using a core inside the tire mold during formation.

BACKGROUND OF THE INVENTION

It is known to produce tires from castable elastomers, in particular from polyurethane, for example, by the spin-casting method. The production process is complicated, however, when the tire has to contain reinforcement, an essential feature in high-grade tires. In these tires, a reinforcing belt is used to reduce the peripheral increase, and reinforcement of the carcass in the cross-sectional plane of the tire is necessary to restrict the increase in width and to improve the defect characteristics of the tire, particularly in the severely stressed rolling zone. Two methods for producing reinforced cast tires have been developed, involving the use of a detachable tire core (DE-OS Nos. 2,658,374 and 2,900,565) or the assembling of the tire from separately-manufactured parts (for example DE-OS Nos. 2,224,352 and 2,651,876).

With all methods using divided cores, significant mechanical problems and expenses are involved. The production cost is even greater in the case of tires composed of separately-manufactured parts and additionally, problems may arise with these tires in the joints between the parts. The belt reinforcement is usually straightforward for a composite tire, but an effective reinforcement of the sides is difficult to produce, and in particular, a bilateral anchoring of the reinforcement on the bead wires is basically impossible.

In the case of tires in which cord threads are positioned around the core, sometimes according to a particular winding method (German Offenlegungsschriften Nos. 1,505,030; 1,605,684 and 1,301,045), special burls or ridges are required to fix these threads, removing this production method from economical viability. Another disadvantage of this method is that the core frequently buckles due to the presence of these burls or ridges in the tire.

German Offenlegungsschrift No. 1,905,930 discloses joining a reinforcing material which extends in the cross-sectional plane of the tire to the bead wires on both sides, but a variable core is required in this case.

The present invention provides an economical method for producing reinforced tires having bead rings by the casting method.

DESCRIPTION OF THE INVENTION

Figure 1:
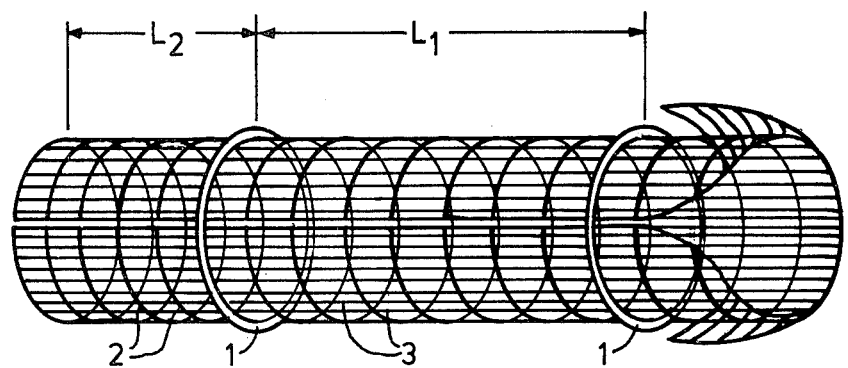
FIG. 1 illustrates the looping-round of the two bead wires.

In the tire-casting process according to the invention, the reinforcement and the bead rings are applied to the core before the toroidal tire core is placed into the mold. In the method of producing this reinforcement according to the invention, the two bead wires are enclosed by a piece of cut fabric which is adapted to the size of the tire, the warp threads in the fabric running substantially perpendicular to the bead wires. The two sides of the cut fabric are joined such that their jointure runs substantially parallel to the weft direction. Because of this, both bead wires are connected via the fabric, since the two bead rings are positioned on either side of the tire core in the fabric, which is pushed together to at least half the circumference of the bead rings and the fabric is then drawn out around the complete core and is joined together at the ends.

More particularly, the present invention is directed to a process for the production of reinforcement for tires having two bead rings, comprising
(a) enclosing the bead rings by a piece of cut fabric which is adapted to the size of the tire, the warp threads in the fabric running substantially perpendicular to the bead rings;
(b) joining the two sides of the fabric, such that the jointure seam runs substantially parallel to the weft direction;
(c) pushing the fabric together to at least half the circumference of the bead rings;
(d) positioning the bead rings on either side of a toroidal tire core;
(e) drawing the fabric around the rings and over the entire core; and
(f) joining the ends of the fabric together.

The piece of cut fabric is basically rectangular, the warp and weft threads running parallel to the ends and sides of the piece. The warp direction should run substantially in the cross-sectional plane of the tire and the belt width must span between the bead wires on either side of the tire. For this reason, the width of the piece of fabric must be at least double the distance between the bead wires over the tire core. The sides may be joined together by sewing, bonding, welding or stitching. The necessary belt width may then be attained by adjusting the resultant seam. If the belt width is too great, forces cannot be directed into the bead wire via the reinforcing belt, and if the belt is too narrow, it is impossible for the reinforcing belt to be drawn onto the tire core at all.

Flexibility of the fabric is not desired in the warp direction and the material and diameter of the warp threads are determined by the strength which is required from them. The warp threads preferably consist of cord based on, for example, polyethylene, polyamide, steel, carbon, glass, Aramite ®2-(para-tert.-butyl-phenoxy)isopropyl-2-chloroethyl sulfite or Rayon ® regenerated cellulose.

In the weft direction, the fabric must be long enough to cover the complete circumference when drawn onto the toroidal core. When the two ends are joined together on the core, the seam joining them runs parallel to the warp direction of the threads. If the fabric overlaps to a sufficient extent and if there are no forces to be absorbed in the weft direction, it has been found that it is sometimes unnecessary to even join the ends of the fabric.

It is important that the fabric can be pushed together sufficiently in the weft direction to, at most, cover half the circumference of the bead wire, in order that the bead rings and fabric can be easily pushed around the core. Thus, the weft threads of the fabric are preferably made of an elastic or comparatively thin textile material.

It is possible to produce fabrics with different warp and weft threads which fulfill the conditions mentioned above. However, it has also been found that textile sheet structures in which the warp and weft threads are the same, and which are "soft" enough to easily push together the piece of cut fabric and to spread out over the core, but have the strength to prevent an undesirable increase in width of the tire and thus to adequately reinforce the tire in its cross-sectional plane, may also be used.

If necessary, several pieces of cut fabric may be applied, one on top of another, on the toroidal core, all of them being joined on both sides to the bead rings.

The piece or pieces of cut fabric do not usually need to be used as reinforcement in the circumferential direction of the tire. A separate belt reinforcement of the tread is normally provided for this purpose and may be easily applied to the toroidal core in the production method according to the present invention. It is obvious that with this process, reinforcement of the side surfaces may also be added in a simple manner and does not have to be joined to the bead wire.

It is of very particular advantage in this production method that a conventional tire core may be used in the mold, resulting in the production of highgrade tires at substantial economies. Markings and other attachment elements are not required on the core. The bead wire and reinforcement are embedded in the tire without supporting elements. The fabric used as the reinforcement only requires two attachment procedures. The first "seam", connecting the bead rings, is effected separately from the tire production and virtually in a fully automatic manner. The second attachment step, i.e., joining the cut fabric in the circumferential direction, takes place on the core. The bead wires on the core are held in place by the reinforcing fabric, without the need for additional fixing points in the mold.

The production method according to the present invention is further described, by way of example, in the drawings.

A textile sheet structure is drawn in a cylindrical shape in FIG. 1. It comprises warp threads (3) (for example, of PE, PA, steel, carbon, glass, Aramite ® or Rayon ®), and weft threads (2) (for example, of PE, PA, cotton, Aramite ®, Rayon ® or PVC). The width of the textile fabric ($L_1$ plus 2 $L_2$) represents the distance, over the core, between bead rings ($L_1$) plus the length of the fabric which is to be drawn over the exposed bead ring ($L_2$) and joined with the fabric already enclosing the other bead ring. The length of the fabric corresponds to at least the circumference of the bead ring. Both sides are passed around the bead wires (1) and are joined together.

Figure 2:
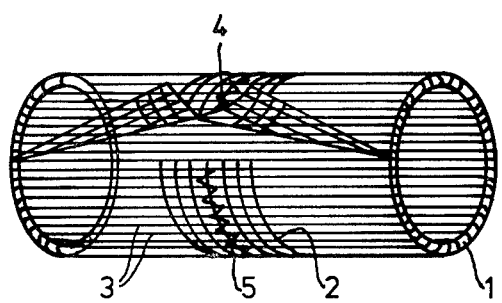
FIG. 2 illustrates the sewing up of the piece of cut fabric reinforcing belt.

The resultant structure is illustrated in FIG. 2. The seam (5) runs substantially parallel to the weft threads. The warp threads (3) run substantially perpendicular to the bead wires (1). An overlap (4) is produced in the circumferential direction of the bead wire.

Figure 3:
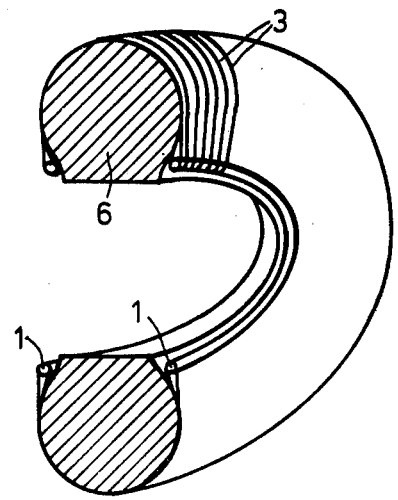
FIG. 3 illustrates the application of the reinforcing belt on the toroidal tire core.

In order to bring the bead wires and the reinforcing fabric onto a tire core (6), the piece of fabric which is now tubular has to be pushed together to less than half the circumference of the bead wire. This condition is illustrated in FIG. 3. The bead wires (1) slide easily over the core and are positioned on either side of the core.

Figure 4:
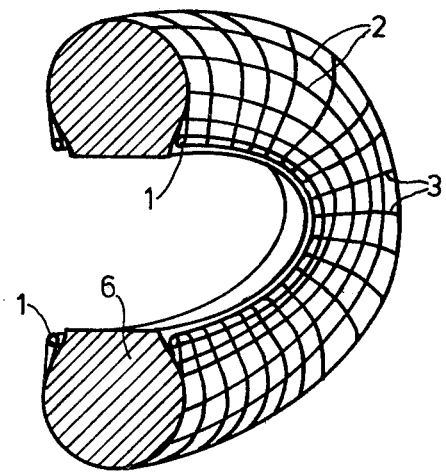
FIG. 4 illustrates the reinforcing belt being drawn out on the core.

In FIG. 4, the tubular piece of fabric is drawn out into a toroidal network on the core and the ends are joined together by a seam (not shown), which runs parallel to the warp threads. Since the spacing of the bead wires is determined by the length of the fabric between them, an additional centering operation for the wires in the mold is not required.

Figure 5:
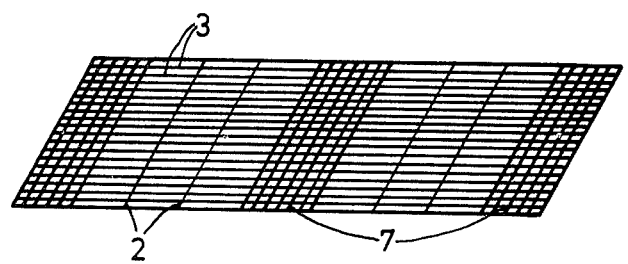
FIG. 5 illustrates a piece of cut fabric with an additional cord layer in the zenith region of the tire.

After the core has been installed in a suitable tire mold, the polyurethane tire may be produced in a known manner, for example, by the spin-casting method. The polyurethane components are introduced into a mixing device which is situated on the axis of rotation. The mixture is directed via a, for example, conical surface to the sprue runners. In consequence of the centrifugal force, the mixture fills up the cavity of the tool. FIG. 5 illustrates a piece of cut fabric which has an additional radial belt reinforcement (7).

Figure 6:
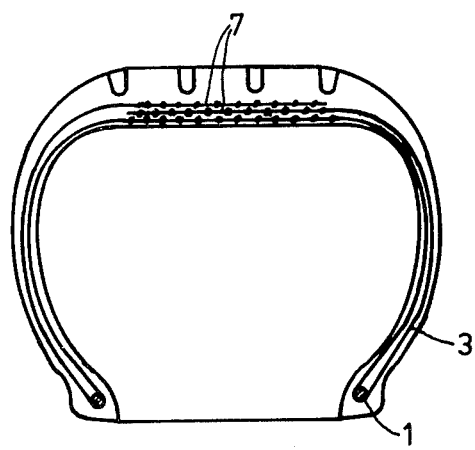
FIG. 6 illustrates a cross-section through a tire having a reinforcing belt according to FIG. 5.

FIG. 6 illustrates a cross-section of a tire having reinforcing fabric according to FIG. 5. In this Figure, the length of the fabric in the weft direction is selected such that three layers having a radial belt reinforcement (7) which are also worked into the textile fabric come to lie in the zenith region.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method for the production of reinforcement for tires having two bead rings, comprising
   (a) enclosing the bead rings by a piece of cut fabric which is adapted to the size of the tire, the warp threads in the fabric running substantially perpendicular to the bead rings;
   (b) joining the two sides of the fabric, such that the jointure seam runs substantially parallel to the weft direction;
   (c) pushing the fabric together to at least half the circumference of the bead rings;
   (d) positioning the bead rings on either side of a toroidal tire core;
   (e) drawing the fabric around the rings and over the entire core; and
   (f) joining the ends of the fabric together.

2. A method according to claim 1, characterized in that a piece of cut fabric is used which, in the warp direction, is preferably made of cord threads based on polyethylene, polyamide, steel, carbon, glass, 2-(para-tert.-butylphenoxy)isopropyl-2-chloroethyl sulfite or regenerated cellulose.

3. A method according to claim 1, characterized in that the piece of cut fabric has threads in the weft direction which are flexible or elastic.

4. A method according to claim 1, characterized in that several pieces of cut fabric are applied one on top of another, and joined around the bead rings.

5. A method according to claim 1, characterized in that additional reinforcement is applied to the core in the circumferential direction of the core.

6. A method according to claim 1, characterized in that cut fabrics are used which have further-longitudinally-reinforced regions.

7. A method for the production of reinforced, cast tires having two bead rings, from castable elastomers, the tire inside the mold being restricted by a toroidal core during the formation, comprising:

(a) enclosing the bead rings by a piece of cut fabric which is adapted to the size of the tire, the warp threads in the fabric running substantially perpendicular to the bead rings;

(b) joining the two sides of the fabric, such that the jointure seam runs substantially parallel to the weft direction;

(c) pushing the fabric together to at least half the circumference of the bead rings;

(d) positioning the bead rings on either side of the core;

(e) drawing the fabric around the rings and over the entire core;

(f) joining the ends of the fabric together;

(g) installing the core into the mold; and (h) casting the tire in the mold.

8. A method according to claim 7, characterized in that a piece of cut fabric is used which, in the warp direction, is preferably made of cord threads based on polyethylene, polyamide, steel, carbon, glass, 2-(para-tert.-butylphenoxy)isopropyl-2-chloroethyl sulfite or regenerated cellulose.

9. A method according to claim 7, characterized in that the piece of cut fabric has threads in the weft direction which are flexible or elastic.

10. A method according to claim 7, characterized in that several pieces of cut fabric are applied one on top of another, and joined around the bead rings.

11. A method according to claim 7, characterized in that additional reinforcement is applied to the core in the circumferential direction of the tire.

12. A method according to claim 7, characterized in that cut fabrics are used which have further-longitudinally-reinforced regions.

* * * * *